(12) United States Patent
Böhm et al.

(10) Patent No.: US 11,979,069 B2
(45) Date of Patent: May 7, 2024

(54) COIL, ELECTRIC MACHINE, AND HYBRID-ELECTRIC AIRCRAFT

(71) Applicant: Rolls-Royce Deutschland Ltd & Co KG, Blankenfelde-Mahlow (DE)

(72) Inventors: Matthias Böhm, Neuendettelsau (DE); Mykhaylo Filipenko, Erlangen (DE); Thomas Gleixner, Falkensee (DE); Peter Gröppel, Erlangen (DE); Marc Lessmann, Grünwald (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 764 days.

(21) Appl. No.: 17/251,874

(22) PCT Filed: Jun. 5, 2019

(86) PCT No.: PCT/EP2019/064643
§ 371 (c)(1),
(2) Date: Dec. 14, 2020

(87) PCT Pub. No.: WO2019/238494
PCT Pub. Date: Dec. 19, 2019

(65) Prior Publication Data
US 2021/0257872 A1    Aug. 19, 2021

(30) Foreign Application Priority Data

Jun. 15, 2018    (DE) .................... 10 2018 209 687.2

(51) Int. Cl.
*H02K 3/28*    (2006.01)
*B64D 27/24*    (2006.01)
(Continued)

(52) U.S. Cl.
CPC ............... *H02K 3/28* (2013.01); *B64D 27/24* (2013.01); *H02K 3/24* (2013.01); *H02K 15/045* (2013.01); *H02K 3/04* (2013.01)

(58) Field of Classification Search
CPC .................................. H02K 3/04; H02K 3/28
See application file for complete search history.

(56) References Cited

U.S. PATENT DOCUMENTS 1,406,092 A    2/1922    Schulz et al.
7,605,513 B2    10/2009    Tanimoto et al.
(Continued)

FOREIGN PATENT DOCUMENTS

DE    112018000583 T5    11/2019
EP    2451050 A1    5/2012
GB    1062669 A    3/1967

OTHER PUBLICATIONS

International Search Report for PCT/EP2019/064643, dated Sep. 20, 2019.
(Continued)

*Primary Examiner* — Gary A Nash
(74) *Attorney, Agent, or Firm* — Lempia Summerfield Katz LLC

(57) ABSTRACT

The coil winding has an electrical conductor for an electrical machine and includes at least two layers. The electrical conductor, following its longitudinal extension, runs inwardly wound in a first of the at least two layers, and then extends to a second of the at least two layers and runs outwardly wound in the second layer. The electrical machine includes at least one such coil winding. The hybrid electric aircraft is in particular an airplane and includes such an electrical machine and/or at least one such coil winding.

16 Claims, 4 Drawing Sheets

(51) Int. Cl.
*H02K 3/04* (2006.01)
*H02K 3/24* (2006.01)
*H02K 15/04* (2006.01)

(56) References Cited

U.S. PATENT DOCUMENTS

| | | | |
|---|---|---|---|
| 2002/0096959 A1* | 7/2002 | Qin | H02K 3/28 |
| | | | 310/208 |
| 2004/0207501 A1 | 10/2004 | Souki et al. | |
| 2005/0258704 A1 | 11/2005 | Oohashi et al. | |
| 2012/0086298 A1* | 4/2012 | Fubuki | H01F 41/071 |
| | | | 336/222 |
| 2013/0062986 A1 | 3/2013 | Takeuchi | |
| 2016/0164360 A1* | 6/2016 | Han | H02K 3/12 |
| | | | 310/208 |
| 2017/0077774 A1* | 3/2017 | Hirabayashi | H02K 1/148 |

OTHER PUBLICATIONS

German Search Report for German Application No. 10 2018 209 687.2 dated Oct. 20, 2021.

* cited by examiner

COIL, ELECTRIC MACHINE, AND HYBRID-ELECTRIC AIRCRAFT

The present patent document is a § 371 nationalization of PCT Application Serial No. PCT/EP2019/064643, filed Jun. 5, 2019, designating the United States, which is hereby incorporated by reference, and this patent document also claims the benefit of German Patent Application No. 10 2018 209 687.2, filed Jun. 15, 2018, which is also hereby incorporated by reference.

TECHNICAL FIELD

The disclosure relates to a coil, to an electric machine, and to a hybrid-electric aircraft, in particular, a hybrid-electric airplane.

BACKGROUND

Coils are regularly used as electromagnetic components for the purpose of converting energy, in particular, in electric machines such as motors and generators. Coils of this kind may be constructed in different ways, in particular, as a cylindrical coil, as a toroidal core coil, or as a disk coil. Coils of this kind may be formed with conductors in the form of solid individual copper conductors or with conductors in the form of braided wires composed of a plurality of individual wires in each case. Disk coils are used, in particular, in the high-voltage and/or high-frequency range.

A problem that arises with disk coils is that an inner end of the conductor that forms the coil has to be routed out of the interior of the coil again for the purpose of making electrical contact with the coil. An internal end of this kind of a conductor that forms the coil will be referred to as an inner connection below. It is known to route an inner connection of this kind out of the coil along an axial direction about which the coil is wound. However, in the case of disk coils, an axial design of the inner connection requires additional space along the areal extents of the disk coil. This arrangement severely limits the possible uses of disk coils. However, a radial design of the inner connection along the areal extents of the disks of the disk coil is disadvantageous in respect of manufacturability and reliability because the thickness of the disk coil, (e.g., the extent of the disk coil perpendicular to its areal extents), is considerably increased. Furthermore, as a result of the direct contact between the inner connection and the turns of the coil, heat dissipation from the disk coil is difficult. In addition, a construction of this kind of a disk coil requires additional material for electrical insulation of the inner connection from the turns of the disk coil. The manufacture and construction of a disk coil of this kind also pose additional challenges. Furthermore, disk coils of this kind may be adapted to other circumstances only with difficulty. For example, in particular, subsequent pressing of the disk coil for increasing the fill factor of the disk coil is made more difficult on account of the internal connection that is routed out. Furthermore, the small bending radius of the inner connection and the difficulty in mechanically fixing it cause a reduction in the degree of reliability, in particular the fail-safety, of the disk coil and a shortening of its service life.

SUMMARY AND DESCRIPTION

The object of the disclosure is therefore to provide a coil for an electric machine which has a low space requirement and a low level of expenditure on insulation and, in particular, a good heat dissipation capability. A further object of the disclosure is to provide an electric machine and a hybrid-electric aircraft which may be formed in a reliable and compact manner.

This object of the disclosure is achieved by a coil for an electric machine, by an electric machine, and by a hybrid-electric aircraft. The scope of the present disclosure is defined solely by the appended claims and is not affected to any degree by the statements within this summary. The present embodiments may obviate one or more of the drawbacks or limitations in the related art.

The coil winding is a coil winding of an electrical conductor for an electric machine. The coil winding includes at least two layers, wherein the conductor, following its longitudinal extent, runs in an inwardly wound manner in a first of the at least two layers, then extends to a second of the at least two layers and runs in an outwardly wound manner in the second layer. In this way, contact may be made with each layer of the at least two layers of the coil winding from the outside because the conductor connects the first and the second layers of the at least two layers to one another internally and runs into the winding from the outside in each layer of the at least two layers. Therefore, in the case of the coil winding, it is not necessary to route an inner connection to the outside along a layer, but rather the topology of the coil winding respectively allows an external connection due to the structure. The coil winding may additionally be easily manufactured by way of a conductor being used during winding of the coil winding and, starting from the center of the conductor, both the first layer being wound around a core and also the second layer being wound around this core. In this case, the first layer and the second layer are offset in relation to one another along an axial direction of the core during winding in such a way that the first and the second layer may be wound along two parallel planes.

The coil winding may be advantageously realized in a compact manner and such that heat may be dissipated in an efficient manner, so that the coil winding may be used in environments which have little installation space and require excellent heat dissipation. Therefore, the coil winding may be advantageously used in aviation applications in particular.

The coil winding includes at least two layers, so that a coil winding, which should have the same thickness as a conventionally wound coil winding perpendicular to the at least two layers, may be wound with a conductor of this kind which is of half the thickness compared to that of a conductor of the conventionally wound coil. If at the same time the number of turns should be maintained compared with a conventionally wound coil, the thickness of the conductor within the direction of extent of the layers may additionally be doubled, so that the number of turns per layer is accordingly halved.

Heat may advantageously be dissipated from the coil winding in a particularly efficient manner because the area of the coil winding available for cooling is increased in size as a result of the two layers.

The coil winding may advantageously be constructed with a circular geometry, a substantially rectangular geometry, or stadium-like or racetrack-like geometry (e.g., oval geometry). A substantially rectangular geometry is expediently understood to refer to a rectangular shape with, in particular, rounded corners, (e.g., with a radius of curvature of at most half or at most one quarter of the shortest dimension of the geometry).

In an development of the coil winding, the coil winding has at least one pair with two further layers in which the conductor extends to a first layer of the pair in a manner still following its longitudinal extent, runs in an inwardly wound manner in the first layer of the pair, then extends to a second layer of the pair and runs in an outwardly wound manner in the second layer of the pair. In this way, the structure of the coil may be cascaded by way of a pair of two further layers being provided in the coil. Cascaded coil windings of this kind may also be easily produced by way of the method for winding the coil winding being correspondingly modified in this development. For example, starting from around a quarter and approximately three quarters of the available conductor, a pair of in each case two layers is wound outward.

The coil winding may additionally include at least one or a plurality of further pairs each with two further layers as described above. In this development of the coil winding, this coil winding may be wound in a correspondingly modified variant of the above-described winding method, so that this coil winding may also be easily manufactured.

In the case of the coil winding, the intermediate space available between the individual layers may advantageously be freely adjusted. As a result, the coil winding may be cooled in a particularly efficient manner as a result of the cooling area available. For example, a correspondingly cascaded coil winding allows areal cooling of the coil winding along a plurality of layers which run parallel to one another.

In an development of the coil winding, the conductor is a wire. Alternatively, the conductor may be a braided wire in the case of the coil winding. The topology of the coil winding advantageously allows the braided wire to be turned over, (e.g., to be twisted through 180 degrees), in particular, along that section of the braided wire along which the braided wire passes from the respective first layer to the respective second layer. As a result of this twisting of the braided wire through 180 degrees, storage locations of individual wires of the braided wire are standardized, so that electrical power losses on account of so-called skin proximity effects and also on account of externally acting fields which change over time in high-frequency applications may be efficiently reduced or avoided in the coil winding.

Therefore, it is not necessary to use braided wires with so-called stranding, so that the accompanying direct current losses and compromises in respect of the filling level do not have to be accepted.

The individual layers of the coil winding may expediently be pressed together. In this way, the coil may be compressed, so that a particularly high filling level of the coil winding may be achieved.

The coil winding is expediently formed with at least one flat conductor. In this way, as already described above, the coil winding may be realized with the same external dimensions as a conventional coil winding.

In the case of the coil winding, the at least two layers or the layers of one or more pairs suitably extend along one plane. In this way, the coil winding may be wound in a particularly uncomplicated manner by way of, for example, one or more rotating winding cores which wind the layers of the coil winding being used.

The electric machine has at least one coil winding as described above. On account of the abovementioned compact coil winding which may be cooled in an efficient manner, an electric machine may be constructed in a compact manner and allow for efficient cooling of the at least one coil winding.

The electric machine may have at least one cooling fluid path arranged between at least two layers of at least one coil winding of the electric machine. The electric machine advantageously has a respective cooling fluid path between the two layers, e.g., between the two layers of a respective pair and/or between the pairs. The cooling fluid path may be a cooling liquid path. In this way, the electric machine may be constructed such that the electric machine may be cooled in a particularly efficient manner and accordingly may be operated in an efficient and fail-safe manner.

The hybrid-electric aircraft is, in particular, an airplane. The hybrid-electric aircraft has at least one electric machine and/or at least one coil winding as described above. The hybrid-electric aircraft may include at least one electric machine and a cooling circuit having at least one cooling fluid path of this kind as described above.

BRIEF DESCRIPTION OF THE DRAWINGS

The disclosure will be discussed in more detail below on the basis of an exemplary embodiments illustrated in the drawings, in which.

DETAILED DESCRIPTION

The coil winding 100 shown in FIG. 1 includes a conductor W which will be described below in its profile, following its longitudinal extent, starting from its first connection end W1.

Starting from its first connection end W1, the conductor W runs inward along a planar spiral C1. The spiral C1 extends along a plane P1. In this case, the spiral C1 runs in such a way that the conductor W, along a plurality of turns of the spiral C1, bears respectively against its preceding turn. At an inner point of this spiral C1, the conductor W leaves the spiral C1 and extends in the direction perpendicular to the plane P1 toward a second plane P2 which extends parallel to the plane P1. The conductor W consequently extends along a section L which connects the planes P1 and P2. Within the plane P2, a spiral C2 which runs within the plane P2 and along which the conductor W passes out in a manner wound to the outside adjoins the section L. In this case, a respective turn of the conductor W bears against a preceding, inner turn of the conductor W, if present. After a certain number of turns, the conductor W leaves the spiral C2 and forms a second connection end W2.

Figure 1:
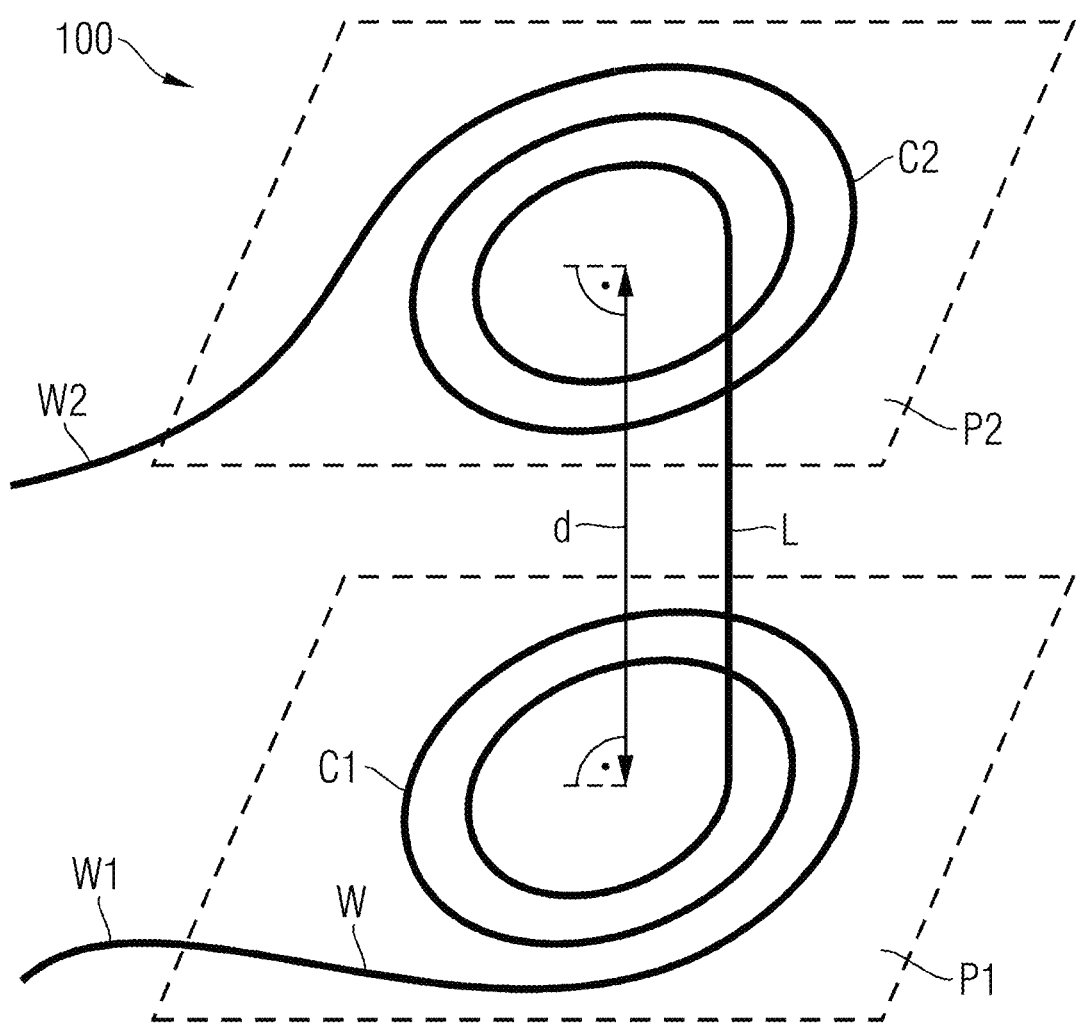
FIG. 1 depicts a perspective illustration of a basic diagram of the topology of a coil winding according to an embodiment.
Figure 2:
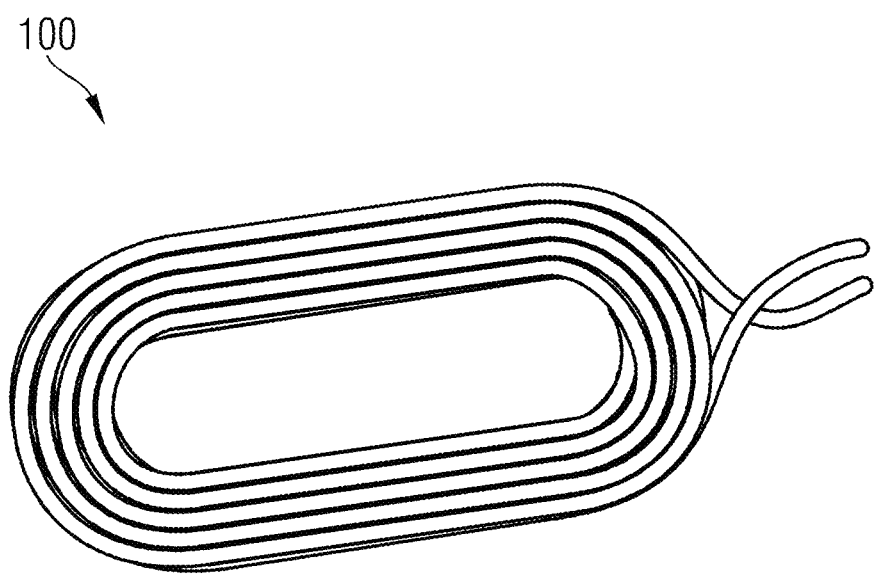
FIG. 2 depicts a perspective illustration of the coil winding according to an embodiment in accordance with FIG. 1.
Figure 3:
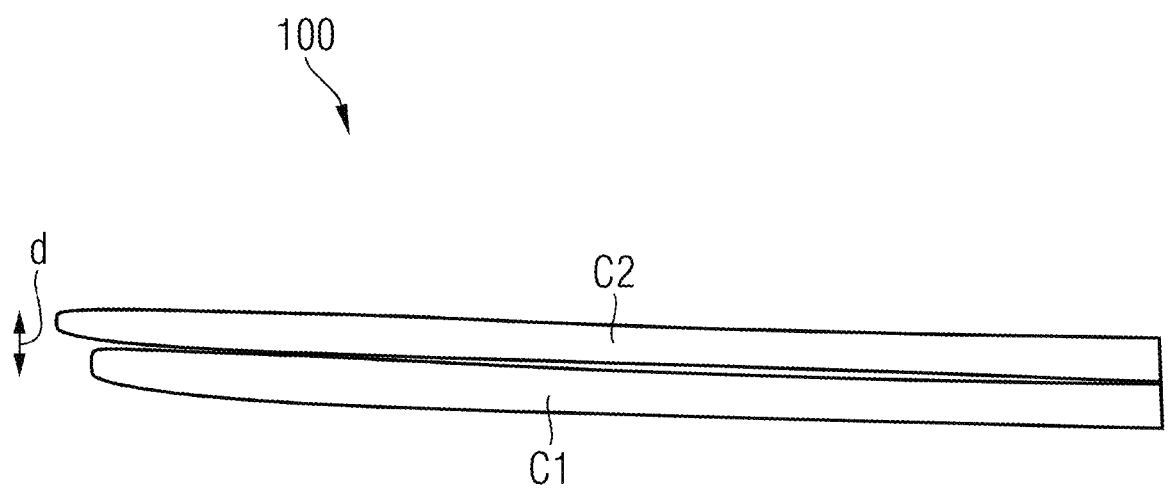
FIG. 3 depicts a side view of the coil winding according to an embodiment in accordance with FIGS. 1 and 2.

The coil winding 100 has, as shown in FIG. 1, two external connection ends, specifically the first connection end W1 and the second connection end W2. As shown in FIGS. 2 and 3, the conductor W is a braided copper wire in the case of the coil winding 100. In further exemplary embodiments, not specifically illustrated, the conductor W is a single wire. As illustrated in FIG. 2, the coil winding runs in two layers which respectively run along the plane P1 or P2. The braided wire is wound in the form of a racetrack geometry within the individual layers P1 and P2. As indicated in FIG. 2, the braided wire is at least four times as wide in the direction of the planes P1 and P2 as in the direction perpendicular to these planes P1 and P2. The braided wire is twisted along the section L through 180 degrees about its longitudinal extent.

In further exemplary embodiments of coil windings 100, not specifically illustrated, one or more further pairs of two layers may be provided in addition to the two layers.

As a result of their distance d from one another, a cooling fluid path which allows areal cooling of the coil winding 100 is formed between the planes P1 and P2.

Figure 4:
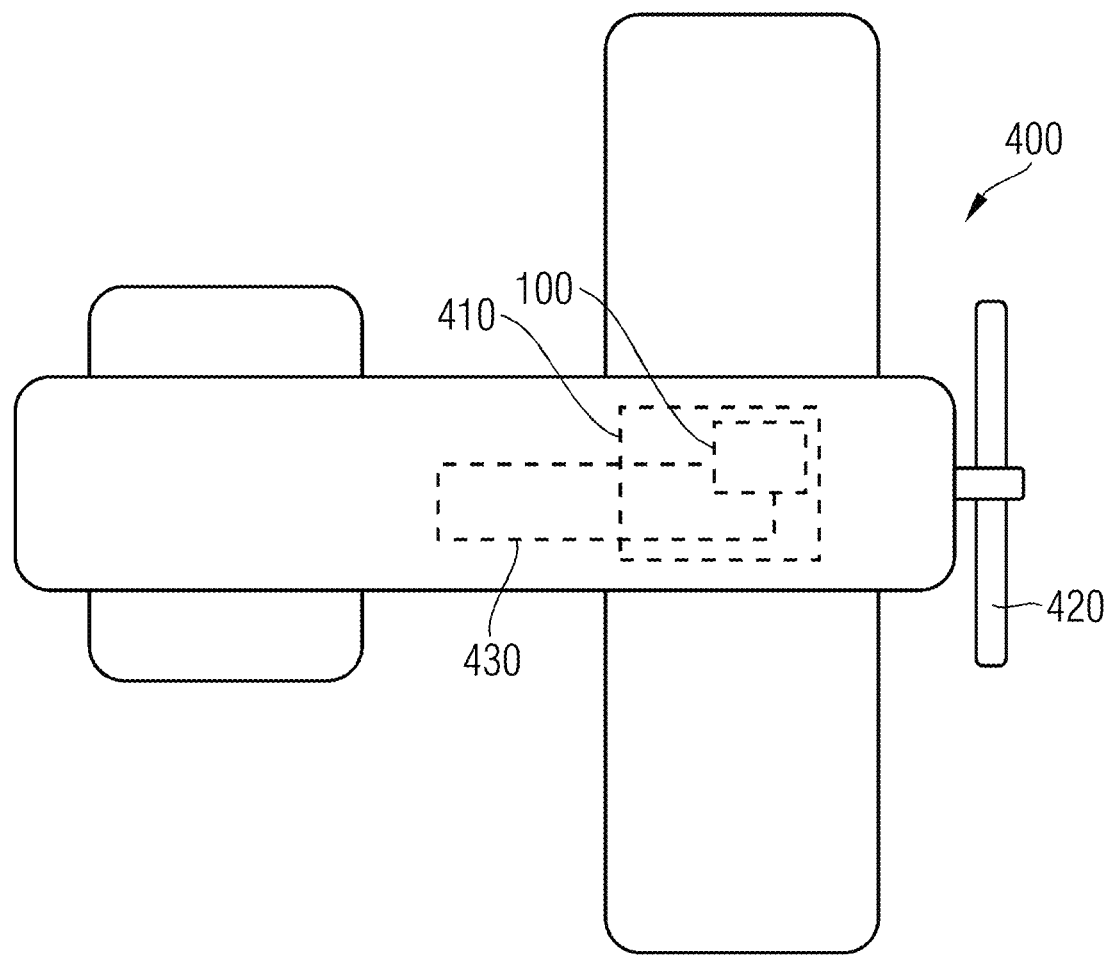
FIG. 4 schematically shows a basic diagram of a hybrid-electric airplane having an electric machine having the coil winding according to an embodiment in accordance with FIGS. 1, 2, and 3.

The hybrid-electric airplane 400 illustrated in FIG. 4 has an electric machine 410, in the illustrated exemplary embodiment an electric motor for driving a propeller 420. The electric machine 410 includes a stator having coil windings 100, the cooling fluid paths of which being part of a cooling circuit 430, as described above. Cooling liquid for cooling the coil windings 100 is conducted through the cooling fluid paths of the cooling circuit 430.

Although the disclosure has been described and illustrated more specifically in detail by the exemplary embodiments, the disclosure is not restricted by the disclosed examples and other variations may be derived therefrom by a person skilled in the art without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A coil winding comprising:
   an electrical conductor for an electric machine; and
   at least two layers,
   wherein the electrical conductor, following a longitudinal extent of the electrical conductor, runs in an inwardly wound manner in a first layer of the at least two layers and then extends to a second layer of the at least two layers and runs in an outwardly wound manner in the second layer, and
   wherein the at least two layers extend along a respective plane.

2. The coil winding of claim 1, further comprising:
   a pair with two further layers in which the electrical conductor extends to a first further layer of the pair in a manner following the longitudinal extent, runs in an inwardly wound manner in the first further layer of the pair, and then extends to a second further layer of the pair and runs in an outwardly wound manner in the second further layer of the pair.

3. The coil winding of claim 2, further comprising:
   at least one additional pair, each additional pair having two additional layers,
   wherein, for each additional pair, the electrical conductor extends to a first additional layer of the respective additional pair in a manner following the longitudinal extent, runs in an inwardly wound manner in the first additional layer of the respective additional pair, and then extends to a second additional layer of the respective additional pair and runs in an outwardly wound manner in the second additional layer of the respective additional pair.

4. The coil winding of claim 1, wherein the electrical conductor comprises a wire.

5. The coil winding of claim 4, wherein the wire is a braided wire.

6. The coil winding of claim 1, wherein the electrical conductor comprises at least one flat conductor.

7. An electric machine comprising:
   at least one coil winding having:
      an electrical conductor; and
      at least two layers,
      wherein the electrical conductor, following a longitudinal extent of the electrical conductor, runs in an inwardly wound manner in a first layer of the at least two layers and then extends to a second layer of the at least two layers and runs in an outwardly wound manner in the second layer; and
   a cooling fluid path between the at least two layers.

8. The electric machine of claim 7, wherein the cooling fluid path is a cooling liquid path.

9. The electric machine of claim 7, wherein the coil winding of the electric machine further comprises at least one pair, each pair with two further layers in which the electrical conductor extends to a first further layer of the respective pair in a manner following the longitudinal extent, runs in an inwardly wound manner in the first further layer of the respective pair, and then extends to a second further layer of the respective pair and runs in an outwardly wound manner in the second further layer of the respective pair.

10. The electric machine of claim 9, further comprising:
    an additional cooling fluid path between the two further layers of a respective pair and/or between pairs.

11. The electric machine of claim 9, further comprising:
    an additional cooling fluid path between the two further layers of each respective pair.

12. A hybrid-electric aircraft comprising:
    an electric machine having at least one coil winding, wherein the at least one coil winding comprises:
       an electrical conductor; and
       at least two layers,
       wherein the electrical conductor, following a longitudinal extent of the electrical conductor, runs in an inwardly wound manner in a first layer of the at least two layers and then extends to a second layer of the at least two layers and runs in an outwardly wound manner in the second layer; and
    a cooling circuit.

13. The hybrid-electric aircraft of claim 12, wherein the cooling circuit comprises a cooling fluid path between the at least two layers of the at least one coil winding.

14. The hybrid-electric aircraft of claim 13, wherein the cooling fluid path is a cooling liquid path.

15. The hybrid-electric aircraft of claim 12, wherein the hybrid-electric aircraft is a hybrid-electric airplane.

16. The hybrid-electric aircraft of claim 12, wherein the at least two layers of the at least one coil winding extend along a respective plane.

\* \* \* \* \*